Nov. 29, 1949  J. T. BOOTH  2,489,516
DOWN GRAIN SAVER FOR HARVESTER REELS
Filed Sept. 19, 1947  2 Sheets-Sheet 1
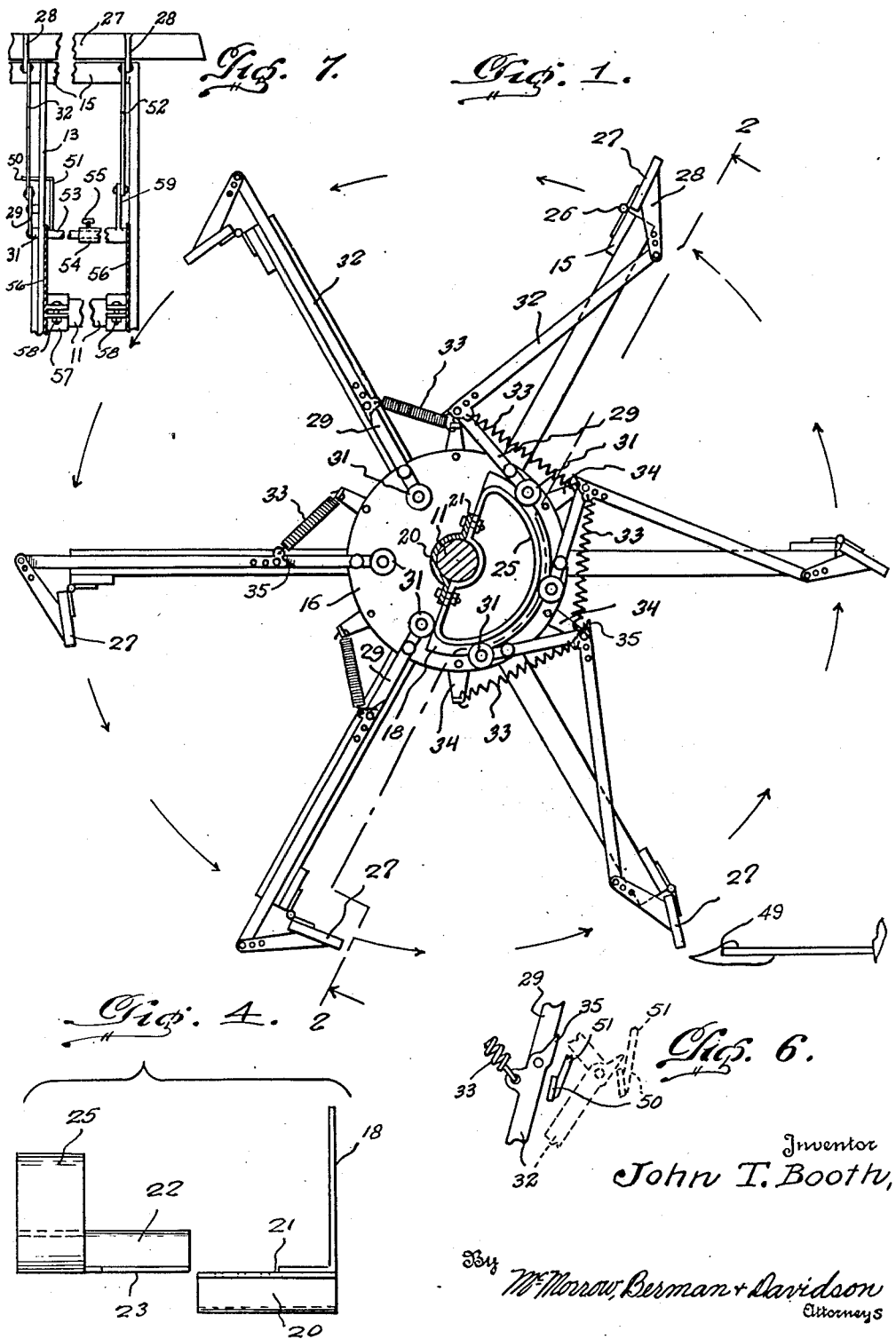

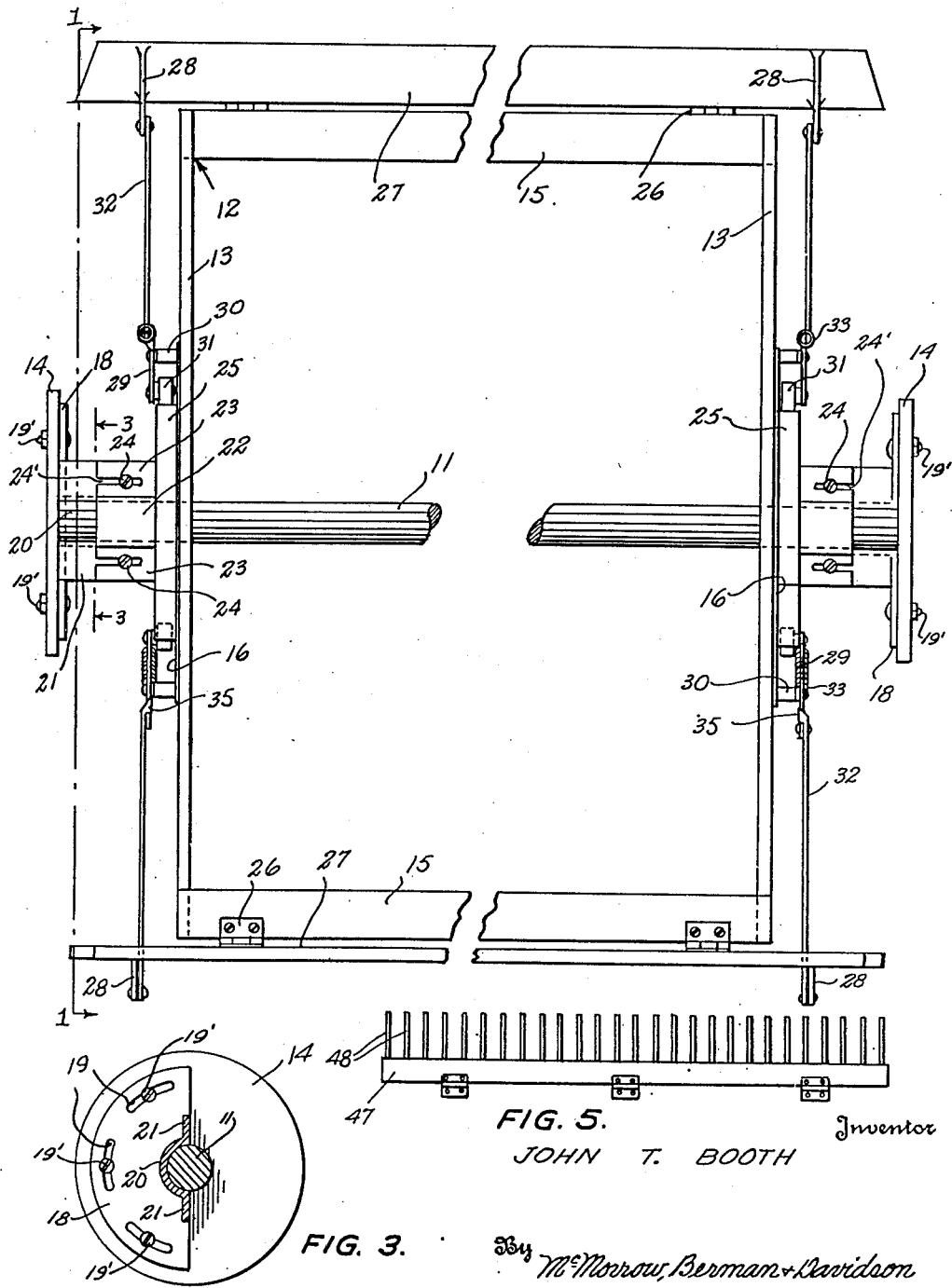

Patented Nov. 29, 1949

2,489,516

UNITED STATES PATENT OFFICE 2,489,516

DOWN GRAIN SAVER FOR HARVESTER REELS

John T. Booth, Hastings, Nebr.

Application September 19, 1947, Serial No. 774,990

1 Claim. (Cl. 56—226)

This invention relates to harvester reels, and more particularly to harvester reels having means to gather up grain which has fallen down as well as the upstanding grain.

A main object of the invention is to provide a novel and improved harvester reel which is simple in construction, efficient in operation and reliable in performance.

A further object of the invention is to provide an improved harvester reel which is light in weight, inexpensive to manufacture, sturdy in construction and which is very effective in gathering fallen grain and short grain stalks.

Further objects and advantages of the invention will become apparent from the following description and claim, and from the accompanying drawings, wherein:

Figure 1 is a transverse vertical cross-sectional view of a harvester reel constructed in accordance with the present invention and taken substantially on the plane of the line 1—1 of Figure 2.

Figure 2 is a longitudinal vertical section with parts broken away and taken substantially on the plane of the line 2—2 of Figure 1.

Figure 3 is a detail elevational view of an angle adjusting member for the cam operator device employed in the harvester reel of Figure 1.

Figure 4 is an exploded elevational detail view of the cam device and adjusting member employed in the harvester reel of Figure 1.

Figure 5 is an elevation of a modified form of auxiliary lath apart from the harvester reel.

Figure 6 is a slightly enlarged fragmentary elevation of a detail and illustrating a modified structure.

Figure 7 is a fragmentary elevation with parts in longitudinal vertical section of the modification of Figure 6.

Referring to the drawings, 11 designates the harvester reel bearing shaft of a conventional harvester. The harvester reel is designated at 12 and is suitably journaled on shaft 11, the reel being rotated by a suitable prime mover by conventional power transmission mechanism not shown.

The reel 12 comprises a plurality of sets of radial spoke members 13 secured at their inner ends to disc members 16. Disc members 16 are fixed to shaft 11 for rotation therewith in any usual well known manner, not shown. The usual lath members 15 are secured to the longitudinally aligned outer portions of spoke members 13.

The ends of shaft 11 outwardly of each disc 16 are supported by stationary plates 14 fixed on suitable frame portions, not shown, of the harvester and have secured thereto semi-circular disc members 18, Figure 3. The discs 18 are formed to provide arcuate bolt slots 19 concentrically disposed relative to shaft 11 which are adapted to receive bolts 19' so that the disc 18 may have a range of angular adjustment around the shaft 11 with respect to the plate 14. The disc member 18 is formed with a semi-cylindrical collar element 20 extending radially thereof and concentrically disposed relative to the shaft 11 and which is provided with diametrically oppositely disposed side flanges 21, 21. Opposing said collar 20 is a semi-cylindrical collar element 22 having longitudinally slotted diametrically opposed side flanges 23, 23 which are adapted to be fastened in abutting relation to the underside of flanges 21, 21 by bolts 24, 24 which engage through the slots 24' in the side flanges 23 so that the collar element 22 is not only opposite collar element 20 but may be axially and longitudinally adjusted with respect thereto along the shaft 11. The opposed collars 20, 22 thus provide a bearing in which the shaft 11 is journaled for rotation. The collar element 22 carries a semi-circular cam element 25 concentrically thereof and which extends radially of the shaft 11 with its arcuate periphery concentric thereto. Thus, discs 18 may be fixed in selected adjusted positions concentrically of shaft 11 so as to remain stationary while shaft 11, discs 16 and the reel are rotating as a unit. Also, cams 25 may be adjusted along the shaft axially thereof to and from operative positions as shown and inoperative positions closer to the plate 18 and clear of the path of the cam engaging rollers 31, to be described later.

An auxiliary lath member 27 is hinged to each lath member 15 by hinges 26 at the outer periphery of reel 12. Such auxiliary lath members 27 are provided with inwardly and rearwardly inclined rear lever arms 28. The disc 16 has secured thereto longitudinally outwardly extending projections 30 lying in the radial planes of spokes 13. A lever member 29 is pivoted intermediate its ends to the free end of each projection 30. Each lever member 29 is pivoted at the outer end thereof to the inner end of a link 32 the outer end of which is pivoted to a respective arm 28 of an auxiliary lath member 27. The inner end of the lever member 29 has rotatably secured thereto a follower roller 31 which is engageable with the periphery of cam element 25. A spring 33 connects the inner end of each link 32 to a radial lug 34 projecting from discs 16 rearwardly adjacent to each projection 30 thereof. A stop lug 35 projects Figure 6, to limit the normal retracted position of each link 32 and lever 29 to substantially radial positions. As can be seen from Figure 1, when the reel rotates it carries with it the lever 29 and roller 31 whereby when such roller 31 engages the arcuate periphery of the stationary cam element 25, the inner end of arm 29 is deflected rearwardly on its pivot 30 so that its outer end swings the inner end of link 32 forwardly and pulls the connected auxiliary lath member 27 to an outwardly projecting position against the tension of spring 33. When the roller 31 leaves the arcuate periphery of the cam member, spring 33 returns the linkage to its original radial position wherein auxiliary lath member 27 extends substantially tangentially to the cylindrical surface defined by the hinges 26.

The cams 25 are positioned relative to shaft 11 so that when the auxiliary lath members 27 are moved downwardly they are in their tangential positions. As the auxiliary lath members approach the lowermost point of their cylindrical paths of travel, their rollers 31 engage the arcuate peripheries of the cams 25 and the lath members 27 are, thereby, extended to the outwardly projecting positions to provide a scooping action to thereby scoop up fallen grain stalks and the shorter grain stalks which would not be harvested by reels of conventional construction and pass the same over sickle bar 49, Figure 1. The lath members 27 resume their tangential positions at the completion of their upward paths of movement by the disengagement of the rollers 31 from the arcuate peripheral portions of the cams 25 and the biasing action of the springs 33.

In Figure 6 a modified form of auxiliary lath member is disclosed and comprises a lath bar 47 having rake teeth 48 on its outer edge. This form of lath operates in the same manner as the preferred form and is adapted to be used where the grain stalks are lying on the ground or when the harvester is used to harvest vines.

In the embodiment of Figures 1 to 6, inclusive, I have shown an arrangement suitable for substantially small harvesters where the length of the reel 12 is substantially small. However, in larger harvesters or combines it is not unusual for the reel to be provided with at least one intermediate series of spokes 13. In such large harvesters I prefer to provide but a single cam 25 adjacent the central series of spokes 13 and provide auxiliary operating means for the lateral ends of the auxiliary lath 27.

Figures 6 and 7 illustrate this modification of the invention which comprises a pair of split discs 56 having split flanges or hubs 57 connected together in any suitable manner as by the bolts 58 through the abutting flanges thereof. A plurality of extensible couplings are journaled in the opposed peripheral portions of the discs 56 substantially in the radial planes of the spokes 13. Each coupling comprises a substantially small rod 53 which telescopes into the opposed free end of an enlarged hollow rod 54. The rods are held in adjusted relation by any suitable means such as the set screw 55. The rod 53 adjacent the associated disc 56 has a radially extending arm 51 fixed thereto which terminates in a laterally outwardly directed extension 50 which is positioned forwardly and in juxtaposition to the link 32 adjacent the pivotal connection with the lever 29, Figure 6. The outer end of the larger rod 54 has a lever arm 59 fixed thereon which corresponds in length to the actuating arm of the lever 29. The free end of the lever arm 59 is pivotally connected to links 52 corresponding to the links 32, and the outer ends of such links 52 are pivoted to the levers 28 of the auxiliary laths 27.

It is apparent from Figure 7 that the axis of the connecting rods 53, 54 are substantially aligned with the normal axis of the rollers 31. In operation when the cam 25 trips the roller 31 the outer end of the lever arm 29 is thrown forwardly taking with it the lower end of the link 52. When this occurs the lever 32 moves to the broken line position Figure 6, and carries with it the lateral arm 50 of the arm 51 of the rod 53, whereby to rotate the connecting rods 53, 54 and actuate the lever arm 59 and link 52 to assist the link 32 in actuating the auxiliary lath 27.

While I have shown and described what are now thought to be the preferred embodiments of the invention, it is to be understood that the same is susceptible of other forms and expressions. Consequently, I do not limit myself to the precise structures shown and described hereinabove except as hereinafter claimed.

What is claimed is:

In a harvester, including a shaft, a reel rotatable with said shaft and including a frame having a plurality of fixed longitudinally extending lath members secured thereto and lying along a cylindrical arc defining the path of movement of said stationary laths upon rotation of said reel, and auxiliary lath members hinged to each of the fixed lath members for swinging movement to and from an extended position radially outwardly of said fixed lath member and a folded position substantially tangential to said arc, the improvement comprising spring means biasing said auxiliary lath members to said folded positions, a cam adjacent said shaft, follower means connected to said auxiliary lath members and normally cooperating with said cam for moving said auxiliary lath members to said extended positions during a selected portion of each rotation of said reel, means mounting said cam for movement axially of said shaft to and from an operative position in the path of said follower means and an inoperative position out of the path of said follower means, and means mounting said cam for adjusting movement concentrically of said shaft.

JOHN T. BOOTH.

REFERENCES CITED

The following references are of record in the file of this patent:

UNITED STATES PATENTS

| Number | Name | Date |
| --- | --- | --- |
| 270,336 | Pulver | Jan. 9, 1883 |
| 895,147 | Beal | Aug. 4, 1908 |
| 981,319 | Seibert | Jan. 10, 1911 |
| 1,770,077 | Kunz | July 8, 1930 |